United States Patent [19]

Chow

[11] Patent Number: 4,848,922
[45] Date of Patent: Jul. 18, 1989

[54] PHOTON CALORIMETER

[75] Inventor: Tze-Show Chow, Hayward, Calif.

[73] Assignee: The United States of America as represented by the United States Department of Energy, Washington, D.C.

[21] Appl. No.: 185,007

[22] Filed: Apr. 22, 1988

[51] Int. Cl.$^4$ .......................................... G01K 17/00
[52] U.S. Cl. .................................................... 374/31
[58] Field of Search .................. 374/29, 31, 32, 120, 374/121, 137, 179, 180; 427/34; 250/336.1, 338, 346

[56] References Cited

U.S. PATENT DOCUMENTS

| | | | |
|---|---|---|---|
| 3,444,739 | 5/1969 | Treharne | 250/338.1 |
| 3,706,226 | 12/1972 | Kramer | 374/32 |
| 4,224,356 | 9/1980 | Singer | 427/34 |
| 4,321,824 | 3/1982 | Martin | 374/32 |
| 4,436,437 | 3/1984 | Beggs | 374/32 |
| 4,449,286 | 5/1984 | Dahlberg | 427/34 |
| 4,522,511 | 6/1985 | Zimmerer | 374/32 |
| 4,526,839 | 7/1985 | Herman et al. | 427/34 |
| 4,726,688 | 2/1988 | Ruel | 374/32 |

OTHER PUBLICATIONS

Gerdeman/Hecht, Arch Plasma Technology p. 48 (1972).

Primary Examiner—William A. Cuchlinski, Jr.
Assistant Examiner—Hohenshell, Jeffrey J.
Attorney, Agent, or Firm—Gary C. Roth; L. E. Carnahan; William R. Moser

[57] ABSTRACT

A photon calorimeter (20, 40) is provided that comprises a laminar substrate (10, 22, 42) that is uniform in density and homogeneous in atomic composition. A plasma-sprayed coating (28, 48, 52), that is generally uniform in density and homogeneous in atomic composition within the proximity of planes that are parallel to the surfaces of the substrate, is applied to either one or both sides of the laminar substrate. The plasma-sprayed coatings may be very efficiently spectrally tailored in atomic number. Thermocouple measuring junctions (30, 50, 54) are positioned within the plasma-sprayed coatings. The calorimeter is rugged, inexpensive, and equilibrates in temperature very rapidly.

3 Claims, 2 Drawing Sheets

PHOTON CALORIMETER

The United States Government has rights in this invention pursuant to Contract No. W-7405-ENG-48 between the U.S. Department of Energy and the University of California for the operation of the Lawrence Livermore National Laboratory.

BACKGROUND OF THE INVENTION

The invention described herein relates generally to photon calorimeters, and more particularly to improved photon calorimeters of simple design and economical construction.

A calorimeter is an apparatus used for measuring quantities of heat. A well known diagnostic technique, for measuring the intensity and spectral characteristics of a beam of photon radiation, is to pass the beam into or through a photon calorimeter and measure the temperature rise induced thereby. In a known type of photon calorimeter, separate thin disks, comprised of various materials, are stacked and clamped closely together. The atomic numbers and arial densities of the individual disks are specifically chosen to somewhat provide tailored radiation absorption properties for the calorimeter. The disks are typically comprised of pure single-element metals, such as beryllium, gold and lead, to name a few, or structural materials of known composition, such as various alloys and plastics. Temperature rise is measured by thermocouples whose measuring junctions are distributively positioned throughout the clamped disk structure of the calorimeter. This type of calorimeter has many disadvantages. For example, the natural and unavoidable gaps that always exist between individual disks, appreciably prolong the time it takes for the calorimeter to equilibrate in temperature. This effect is worsened by the thermal warping of the individual disks that accompanies heat deposition within the disk system. Another very serious disadvantage of this calorimeter is that the amount of spectral tailoring that it can provide is extremely limited, because the disks comprising the calorimeter are limited in number and elemental composition. Inadequate spectral tailoring, in atomic composition, reduces the efficiency of this calorimeter and even makes it incapable of performing some measurements.

Martin, in U.S. Pat. No. 4,321,824 issued Mar. 30, 1982, discloses a high energy laser target board having an array of disk calorimeters spread around the surface of the board to receive laser energy. The energy striking any disk is sensed by a pair of thermal leads connected to the back side of the disk, and the voltage across the leads is amplified and sent to a recording system.

A method and apparatus for measuring radiant energy is taught by Zimmerer in U.S. Pat. No. 4,522,511 issued June 11, 1985. Relatively high energy levels of coherent radiation are caused to impinge upon an absorber surface. Energy from the radiation is transferred from the surface to a fluid coolant in thermal association therewith. The energy carried away by the coolant is measured, preferably, by a thermopile.

It is apparent that there is a need for improved photon calorimeters that equilibrate in temperature more quickly, and provide a better spectral tailoring capability, than presently existing photon calorimeters. It would be advantageous if these improved photon calorimeters were structurally rugged and relatively inexpensive to fabricate.

SUMMARY OF THE INVENTION

It is, therefore, an object of the invention to provide a photon calorimeter that quickly equilibrates in temperature.

Another object of the invention is to provide a photon calorimeter that can be efficiently spectrally tailored.

A further object of the invention is to provide a rugged photon calorimeter that is relatively inexpensive to fabricate.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, a rugged and relatively inexpensive, novel photon calorimeter is provided. The calorimeter often comprises a laminar substrate having two flat and parallel surfaces. The substrate is uniform in density and homogeneous in atomic composition throughout. A coating is plasma-sprayed onto one of the flat surfaces of the substrate. The coating may be applied in distinct layers of materials, as a varying blend in atomic number, or as a combination of these types. In any event, the coating will be generally uniform in density and homogeneous in atomic composition within the proximity of every plane that passes through the coating and is parallel to the surface upon which the coating is applied. Preferably, the calorimeter is provided with means for use in measuring temperature variation. It is often preferred that this means comprise one or more thermocouple measuring junctions positioned within the coating. The junctions are often positioned with respect to the substrate during fabrication, and plasma-sprayed into place as the coating is applied.

It is often preferable to plasma-spray a second coating onto the other flat and parallel surface of the substrate, in fabricating the photon calorimeter of this invention. This coating is similar to the first coating, as described above. That is, the second coating is also generally uniform in density and homogeneous in atomic composition within the proximity of every plane that passes through the second coating and is parallel to the flat surface of the substrate onto which the second coating is applied. It is also often preferable to provide this calorimeter with a means for use in measuring temperature variation. It is frequently preferred that this means comprise positioning one or more thermocouple measuring junctions within each of the two plasma-sprayed coatings of the photon calorimeter.

In another embodiment of this invention, after a coating has been plasma-sprayed onto the flat surface of a substrate, as described above, the substrate is removed from the coating body by, for example, machining or solvent dissolution. Additional layers of materials may then be plasma-sprayed onto either one or both of the outer flat and parallel surfaces of the body. These layers may be of distinct materials or in a varying blend in atomic number, as described above. The body will be generally uniform in density and homogeneous in atomic composition within the proximity of every plane that passe through the body and is parallel to its final outer parallel and flat surfaces. It is often preferable to provide this calorimeter body with a means for use in measuring temperature variation. It is frequently preferred that this means comprise one or more thermocouple measuring junctions positioned within the body. The junctions may be positioned with respect to the body during fabrication and plasma-sprayed into place as described above.

This rugged and relatively inexpensive novel photon calorimeter has the advantageous property of quickly equilibrating in temperature, and provides the further benefit that it can be easily and efficiently spectrally tailored.

BRIEF DESCRIPTION OF THE DRAWINGS

The accompanying drawings, which are incorporated into and form a part of the specification, illustrate an embodiment of the invention and, together with the description, serve to explain the principles of the invention. In the drawings.

DETAILED DESCRIPTION OF THE INVENTION

Figure 1:
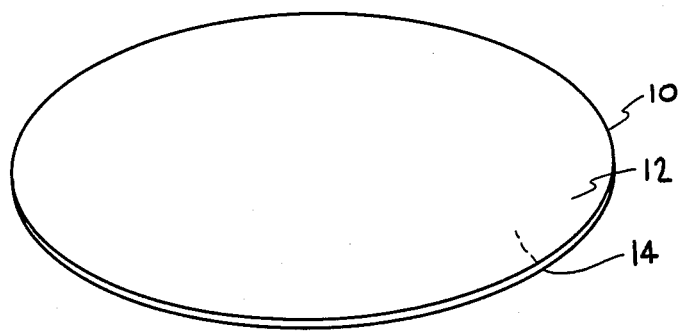
FIG. 1 is a perspective view of a laminar substrate, which is a component part of a photon calorimeter, in accordance with the invention.

Reference will now be made in detail to the present preferred embodiment of the invention, an example of which is illustrated in the accompanying drawings. Reference is first made to FIG. 1, which provides a perspective view of a laminar substrate 10. Every photon calorimeter of this invention either incorporates a laminar substrate, such as laminar substrate 10, within its structure, or makes use of such a substrate in its fabrication. Laminar substrate 10 has a flat top surface 12 and, parallel thereto, a flat bottom surface 14. Substrate 10 is shown as disk shaped and, indeed, this shape is frequently very practical and convenient in use; however, other shapes, such as square, rectangular, oval, diamond and so forth, may frequently be employed in the practice of this invention. It is critical that the laminar substrate have two flat surfaces and that they be parallel, as are surfaces 12 and 14. Laminar substrate 10 is uniform in density and homogenous in atomic composition throughout. Substrate 10 may be comprised of pure single-element metals, alloys, plastics, structural materials of known and uniform composition, and the like, without limitation. It is only necessary that the material comprising laminar substrate 10 permit it to fulfill its substratum function and act as an underlying structural support.

Figure 2:
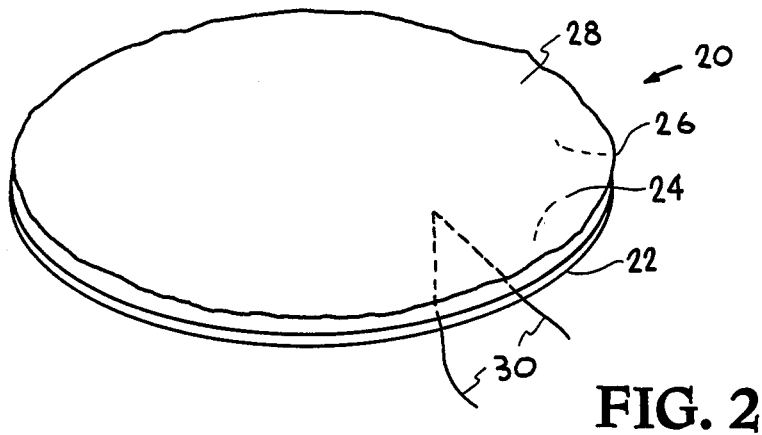
FIG. 2 is a perspective view of a photon calorimeter, in accordance with the invention.

Reference is now made to FIG. 2, which provides a perspective view of a photon calorimeter 20, in accordance with this invention. Calorimeter 20 is comprised of a laminar substrate 22, that is exactly the same as laminar substrate 10 of FIG. 1. Laminar substrate 22 has a flat top surface 24, and a flat bottom surface 26, with the surfaces 24 and 26 being parallel. A plasma-sprayed coating 28 is shown on flat top surface 24. Plasma-spraying is a very well known and relatively economical technique wherein a starting material, usually in powder form, is heated in a plasma and then projected at high velocity against a substrate whereupon bonding occurs. The plasma is often produced by partially ionizing a gas, such as nitrogen or argon, in an electric arc and then passing it through a small orifice to thereby produce a jet of extremely hot gas moving at a very high velocity. Virtually any metal or compound can be applied by plasma-spraying. Plasma-sprayed coating 28, as is usual with such coatings, is laid down in layers that can each be independently controlled in composition. Thus, plasma-sprayed coating 28 is generally uniform in density and homogeneous in atomic composition within the proximity of every plane that is parallel to surface 24 and passes through coating 28. The individual plasma-sprayed layers comprising plasma-sprayed coating 28, and other such coatings, are usually not visually distinguishable from one another, and thus, are not specifically indicated in the figures. Merely as an example, laminar substrate 22 may be comprised of titanium, with plasma-sprayed coating 28 comprised of first copper, and then niobium on top of the copper, and finally tungsten on top of the niobium. As another example, laminar substrate 22 may be comprised of an iron and carbon alloy, with plasma-sprayed coating 28 comprised of first layers of pure nickel, then layers of nickel and zirconium with the atomic percentage of zirconium gradually increasing, then layers of pure zirconium, then layers of zirconium and silver at fixed percentages, and finally layers of pure lead. Plasma-sprayed coating 28 may be comprised of any material or materials that can be plasma-sprayed. The temperature expansion characteristics of the materials comprising substrate 22 and the first few layers of coating 28 must be considered in designing any particular photon calorimeter 20. Usually, the materials to be plasma-sprayed to form coating 28 are obtained as powders having diameters in the approximate range from 1 to 30 microns, and often the materials comprising coating 28 are laid down in layers approximately 10 to 50 mils in thickness. In any given situation, the actual materials and thicknesses selected for any photon calorimeter, such as photon calorimeter 20, are chosen to specifically fit the radiation absorption properties of the calorimeter to the relevant experimental circumstances. Techniques for doing this are very well known in the relevant physical and engineering arts. At any location within plasma-sprayed coating 28, the density is usually about 80 to 95 percent of the full theoretical density of the material at that location. This slight structural porosity is a significant advantage in releasing thermal stress in use, avoiding strain-related cracks, and thereby allowing the structure to quickly come to temperature equilibrium and thus provide an accurate measurement.

Laminar substrate 22 and plasma-sprayed coating 28 provide an apparatus for use in measuring quantities of heat, and thus comprise photon calorimeter 20. It is often preferable that calorimeter 20 further comprise means for use in measuring the temperature variation within the calorimeter structure. Frequently this is preferably accomplished by positioning one or more thermocouple measuring junctions, such as thermocouple measuring junction 30, shown in FIG. 2, within plasma-sprayed coating 28. As is very well known, a thermocouple is a device that uses the voltage developed by the junction of two dissimilar metals to measure temperature differences. Two wires of dissimilar metals welded together at the ends make up the basic thermocouple. One junction, the thermocouple measuring junction, is placed at the point where temperature is to be measured. The other junction, called the reference or cold junction, is maintained at a known reference temperature. The voltage developed between the two junctions is approximately proportional to the difference between the temperatures of the two junctions, and may be measured by including a suitable voltmeter in the circuit. Usually, extension leads are used to connect the thermocouple measuring junction with the reference junction and voltmeter. For this reason only the thermocouple measuring junction 30, and no thermocouple apparatus related thereto, is shown in FIG. 2. Thermocouple measuring junction 30 is positioned with respect to laminar substrate 22 during fabrication, and plasma-sprayed into place as plasma-sprayed coating 28 is applied.

Figure 3:
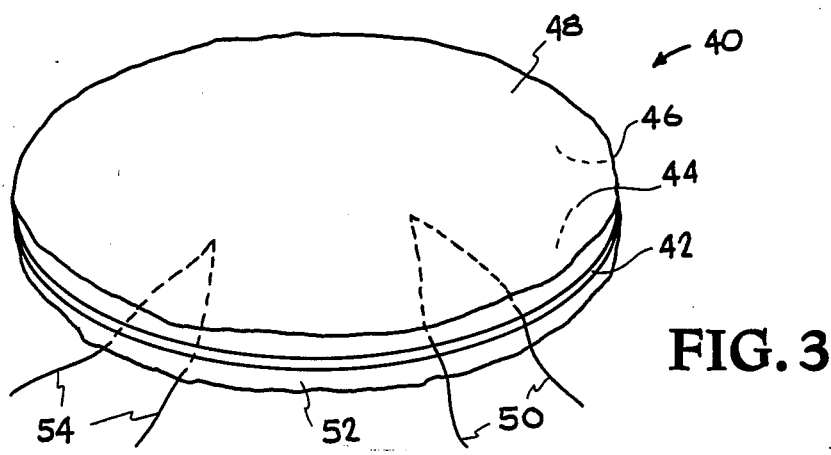
FIG. 3 is a perspective view of a second photon calorimeter, in accordance with the invention.

Reference is now made to FIG. 3, which gives a perspective view of another photon calorimeter 40, in accordance with the invention. Photon calorimeter 40 is comprised of a laminar substrate 42, having a flat top surface 44 and a flat bottom surface 46, a plasma-sprayed coating 48 on flat top surface 44, and a thermocouple measuring junction 50 within coating 48, with each of these parts being exactly the same as the directly corresponding parts of photon calorimeter 20, as described above. Photon calorimeter 40 further comprises a second plasma-sprayed coating 52, that is applied to the flat bottom surface 46 of laminar substrate 42. Plasma-sprayed coating 52 is generally uniform in density and homogeneous in atomic composition within the proximity of every plane that is parallel to flat bottom surface 46 and passes through coating 52. As a preferred means for use in measuring temperature variation within photon calorimeter 40, a second thermocouple measuring junction 54 is positioned within the second plasma-sprayed coating 52. In other words, photon calorimeter 40 is the substrate 42 with coatings 48 and 52 on opposite sides, and with thermocouple measuring junctions 50 and 54 within coatings 48 and 52, respectively. The plasma-sprayed coating 52 and the thermocouple measuring junction 54, are exactly as coating 48 and junction 50, or coating 28 and junction 30, as described above. The materials comprising coatings 48 and 52 will usually, but not always, be different, depending on the intended use of calorimeter 40. For example, the materials comprising coating 48 may be of generally low atomic number, and the materials comprising coating 52 may be of generally high atomic number. Similarly, coating 48 may be generally thin, with coating 52 being relatively thick, and so on. Also, thermocouple measuring junctions 50 and 54 will usually, but not always, be comprised of different metals, as the situation requires. Photon calorimeter 40 may be easily and ) efficiently spectrally tailored in atomic number.

Figure 4:
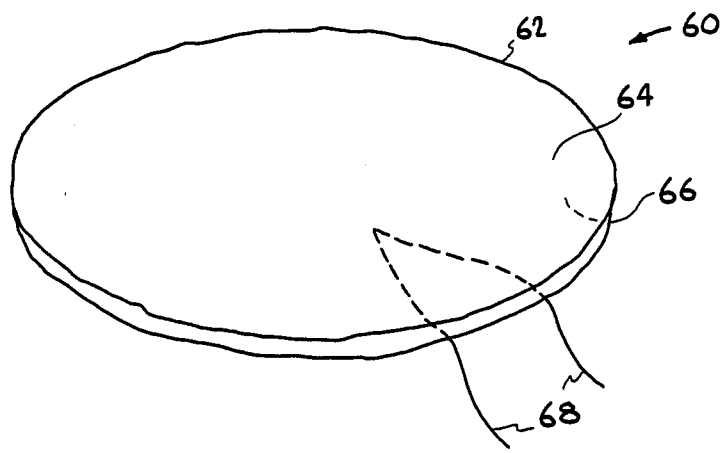
FIG. 4 is a perspective view of a third photon calorimeter, in accordance with the invention.

Reference is now made to FIG. 4, which gives a perspective view of another related photon calorimeter 60, in accordance with the invention. Photon calorimeter 60 is comprised of a plasma-sprayed body 62 that has an outer top flat surface 64, and an outer bottom flat surface 66, with surfaces 64 and 66 being parallel. A thermocouple measuring junction 68 is positioned within plasma-sprayed body 62, as shown. Calorimeter 60 is fabricated by first plasma spraying a coating onto a substrate, such as coating 28 and substrate 22 of FIG. 2, and then removing the substrate by any suitable means such as, for example, by machining or by solvent dissolution. In this application, only the surface of the substrate to which the coating is applied need be flat. Additional layers of materials are then plasma-sprayed onto either or both of the sides of the coating, to thereby form the plasma-sprayed body 62. As described above, with respect to FIGS. 2 and 3, the added layers may be of distinct materials or in a varying blend in atomic number. Thus, plasma-sprayed body 62 is generally uniform in density and homogeneous in atomic composition within the proximity of every plane that passes through body 62 and is parallel to surfaces 64 and 66. Body 62 may be comprised of any material or materials that can be plasma-sprayed, and possesses all the advantages of coating 28, of FIG. 2, and coatings 48 and 52, of FIG. 3, as described above. It is often preferable that photon calorimeter 60 further comprise means for use in measuring the temperature variation within plasma-sprayed body 62. As shown in FIG. 4, this may be accomplished by thermocouple measuring junction 68, that is positioned with respect to body 62 during fabrication, and plasma-sprayed into place.

It is thus appreciated that in accordance with the invention as herein described and shown in FIGS. 1 to 4, a rugged and relatively inexpensive photon calorimeter that quickly equilibrates in temperature and provides easy and efficient spectral tailoring, is provided.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A photon calorimeter comprising:
   a laminar substrate having a first flat surface and a second flat surface parallel thereto, with the substrate being uniform in density and homogenous in atomic composition throughout;
   a plasma-sprayed coating on the first flat surface of the substrate, with the coating being generally uniform in density and homogenous in atomic composition within the proximity of every plane that passes through the coating and is parallel to the first flat surface; and
   at least one thermocouple measuring junction positioned within the coating, to provide a means for use in measuring temperature variation within the calorimeter.

2. A photon calorimeter comprising:
   a laminar substrate having a first flat surface and a second flat surface parallel thereto, with the substrate being uniform in density and homogenous in atomic composition throughout;
   a first plasma-sprayed coating on the first flat surface of the substrate, with the first coating being generally uniform in density and homogenous in atomic composition within the proximity of every plane that passes through the first coating and is parallel to the first flat surface;

a second plasma-sprayer coating on the second flat surface of the substrate, with the second coating being generally uniform in density and homogenous in atomic composition within the proximity of every plane that passes through the second coating and is parallel to the second flat surface; and at least one thermocouple measuring junction positioned within the first coating and at least one thermocouple measuring junction positioned within the second coating, to provide a means for use in measuring temperature variation within the calorimeter.

3. A photon calorimeter comprising:

a plasma-sprayed body having a first flat surface and a second flat surface parallel thereto, and being generally uniform in density and homogenous in atomic composition within the proximity of every plane that passes through the body and is parallel to the first and second flat surfaces; and at least one thermocouple measuring junction positioned within the plasma-sprayed body, to provide a means for use in measuring temperature variation within the calorimeter.

* * * * *